M. C. HUTCHINSON.
PISTON AND RINGS THEREFOR.
APPLICATION FILED FEB. 13, 1918.
1,348,998.
Patented Aug. 10, 1920.
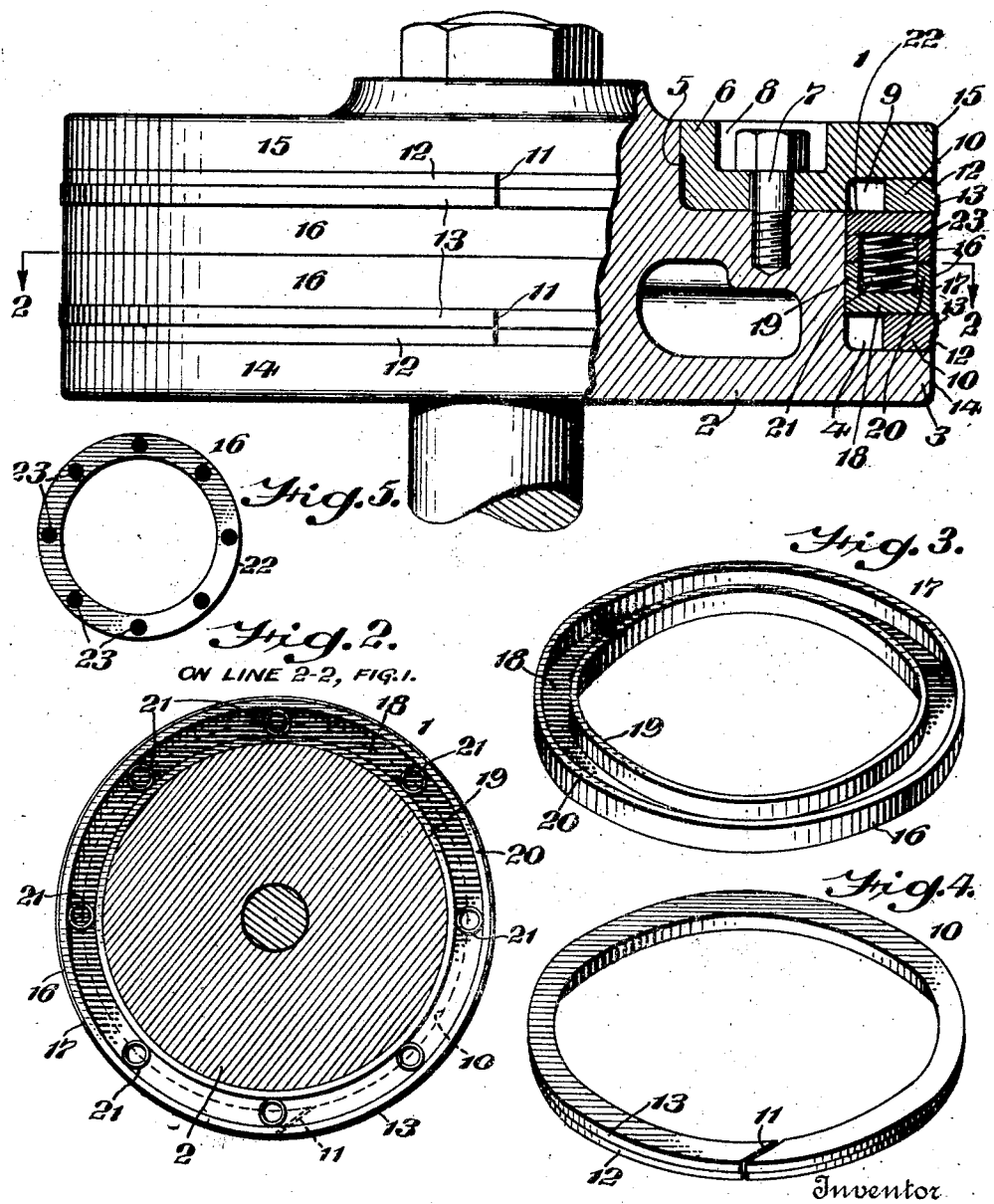

UNITED STATES PATENT OFFICE.

MORTON C. HUTCHINSON, OF WOODBURY, NEW JERSEY, ASSIGNOR OF ONE-HALF TO LEON G. BUCKWALTER, OF MERCHANTVILLE, NEW JERSEY.

PISTON AND RINGS THEREFOR.

1,348,998.  Specification of Letters Patent.  Patented Aug. 10, 1920.

Application filed February 13, 1918. Serial No. 216,904.

*To all whom it may concern:*

Be it known that I, MORTON C. HUTCHINSON, a citizen of the United States, residing at Woodbury, county of Gloucester, State of New Jersey, have invented a new and useful Piston and Rings Therefor, of which the following is a specification.

My invention consists of a novel construction of a piston and particularly the rings therefor, wherein I employ in conjunction with the piston body and its follower a novel assemblage of outer snap rings which are transversely split and a pair of solid intermediate bull rings one of the latter being of annular trough shape and the other having spring receiving pockets, said bull rings having their contiguous annular faces juxtaposed and abutting when assembled, said bull rings being held in the desired position with respect to said snap rings by a plurality of springs, whereby said snap rings cannot become loose by wear, as said springs provide a permanent adjustment for all of said rings, whereby a tight and efficient piston is produced, insuring a sealed joint on the steam side of the snap ring, which piston can be cheaply manufactured and readily assembled or taken apart for the purpose of inspection or repairs without necessitating the employment of skilled labor.

For the purpose of illustrating my invention, I have shown in the accompanying drawing an embodiment which is at present preferred by me, since the same will give in practice satisfactory and reliable results, although it is to be understood that the various instrumentalities of which my invention consists can be variously arranged and organized and that my invention is not limited to the precise arrangement and organization of these instrumentalities as herein shown and described.

Figure 1 represents a side elevation of a novel construction of a piston and particularly its packing rings embodying my invention, a portion of said piston and rings being shown in section.

Fig. 2 represents on a reduced scale a section on line 2—2 Fig. 1.

Fig. 3 represents a perspective view of one of the bull rings employed in detached position.

Fig. 4 represents a perspective view of one of the snap rings employed in detached position.

Fig. 5 represents a plan view of the other bull ring showing the pockets therein.

Similar numerals of reference indicate corresponding parts in the figures.

Referring to the drawings:

1 designates my novel construction of piston, the same comprising the piston body 2, having the piston flange 3, above which is the piston ring chamber 4. The opposite side of said piston body has a recess 5 therein in which is seated the follower 6, which is held in position by a plurality of fastening devices 7, whose heads are preferably seated in the recesses 8, while the inner portion of said follower is circumferentially recessed, as at 9, for the reception of the contiguous snap ring 10, the latter being transversely cut as indicated at 11, Fig. 4, to enable it to be fitted butt to butt without fear of jamming in the bore of the cylinder (not shown) while working.

There are preferably two of the snap rings employed as seen in Fig. 1, the lower ring being located in the recess 4 of the piston body contiguous to the flange 3. The snap rings 10 have a portion of their periphery removed or cut away, as indicated at 12, thereby leaving a circumferential peripheral portion 13 of slightly larger diameter than the portion 12, as will be understood from Fig. 1. The peripheral portions 12 of the snap rings 10 when the parts are assembled are of substantially the same diameter as the outer peripheral portions 14 and 15 of the piston body 2 and follower 6 respectively, the diameter of said portions 12 further being substantially the same as the outer peripheral diameters 16 of the two intermediate bull rings 17, whose construction will now be described, and since these rings are functionally substantially the same, a description of one will suffice for both.

One of the bull rings 17 has an annular solid trough-shaped body having the annular trough-shaped recess 18, and the annular inner and outer walls 19 and 20. The other of said flat bull rings 22 is in the form of a solid ring and also has the inner and outer walls 19 and 20 and the spring receiving pockets 23, see Fig. 5. When the two bull rings are assembled, the juxtaposed faces of the inner and outer annular walls abut, as indicated in Fig. 1. In the spring receiving pockets 23 formed between said walls 19 and 20, I locate a plurality of springs 21, it being apparent that the number of said pockets and springs may be increased or diminished according to requirements, as will be understood from Fig. 2, whereon I have shown eight thereof, which number I have found to give very satisfactory results in practice.

The manner of assembling the snap rings and the solid bull rings with respect to the piston and its follower will be understood from Fig. 1, the two outer snap rings being located in the recesses 4 and 9, and the two bull rings being located between said snap rings, one of the latter being contiguous to the piston flange 3, thereby insuring a sealed joint on the steam side of a snap ring. Special attention is directed to the fact that the principle of my invention differs from piston rings commonly employed since my snap rings are not forced by internal spring pressure or mechanically against the cylinder wall, the advantages of which will be apparent.

It will be obvious that my novel construction of piston can be cheaply made, as the accuracy required in fitting the rings in a groove is obviated as only smooth surfaces are required.

It will further be obvious to those skilled in the art that the snap rings cannot become loose by wear as the tension of the springs 21 against the bull rings provides for permanent adjustment of the coacting parts.

While I have shown two snap rings as being employed, it will be apparent that additional snap rings may be employed, if desired.

It will further be apparent to those skilled in the art, that by cutting away the snap rings for a part of their depth, as indicated at 12, whereby the annular portions 12 and 13 are formed of different diameters, I allow acting or initial steam to balance pressure which must be latent back of the rings in high pressure and middle pressure cylinders, which feature may be omitted in pistons for low pressure cylinders.

It will be obvious that my novel construction of piston may be employed to advantage not only in steam engines, but in internal combustion engines or engine cylinders of any character wherein fluid or gas of any character is employed to reciprocate the piston.

It will further be seen from the foregoing that by the employment of the solid bull rings 17 and 22 whose inner annular walls seat upon the piston body and whose outer periphery is of substantially the same or a little less than the cylinder diameter or bore, in conjunction with the snap rings 10, all of said rings whose walls are contiguous being rectilinear and parallel as are also the contiguous walls of the piston flange and follower flange, I have produced a device which can be cheaply machined, since there are no L or T shaped grooves or dovetails present and furthermore the direction of the slight expansion and contraction of the snap rings will always be in a line at right angles to the travel of the piston, so that I have produced a novel device which is substantially leak proof and can be manufactured without difficulty and at a small cost.

In pistons of the prior art, which are commonly employed, with which I am very familiar, it is commonly the practice to force the snap rings against the cylinder wall by springs or mechanical devices exerting an internal pressure outwardly on the piston rings or against juxtaposed oblique walls of contiguous ring sections or the like. The principle of my invention is exactly opposite, since my invention is designed to prevent the snap rings from being forced mechanically or otherwise too hard against the cylinder wall, and since the side walls of the snap rings and the contiguous walls with which they abut are rectilinear and extend at a right angle to the direction of travel of the piston, the outer working peripheries 13 of said rings can automatically adjust themselves with respect to the contiguous bore of the cylinder, it being apparent that the tension of the springs 21 causes the solid bull rings and snap rings to assume at all times the proper position relative to each other and to the piston body and follower.

It will now be apparent that I have devised a novel and useful construction of a piston and rings therefor which embodies the features of advantage enumerated as desirable in the statement of the invention and the above description, and, while I have, in the present instance, shown and described a preferred embodiment thereof which will give in practice satisfactory and reliable results, it is to be understood that the same is susceptible of modification in various particulars without departing from the spirit or scope of the invention or sacrificing any of its advantages.

Having thus described my invention, what I claim as new and desire to secure by Letters Patent, is:

1. In a piston, a body having an outer peripheral flange and a follower having its outer portion also provided with a flange, the chamber between said flanges containing a plurality of outer snap rings transversely cut, said snap rings having their peripheral portions of different diameters, solid bull rings located between said snap rings, and having their outer diameters substantially coincident with the outer diameters of said flange and follower and the lesser diameters of said snap rings, said bull rings consisting of a solid annular trough-shaped ring and a second ring having flat annular walls and spring holding pockets, said solid bull rings having their contiguous walls abutting, and a plurality of springs located in said pockets for pressing said bull rings outwardly against said snap rings to provide permanent adjustment for said rings.

2. In a piston, a body having an outer peripheral flange, a follower having its outer portion also provided with an outer flange, and a plurality of snap rings and solid bull rings contained in the chamber between said flanges, said snap rings being cut, and one snap ring being contiguous to said body flange while the other is contiguous to said piston flange, a portion of the outer periphery of each of said snap rings being cut away so that said snap rings have different diameters, said bull rings being located between said snap rings and one thereof being of annular trough-shape while the other of said bull rings has flat annular walls and spring receiving pockets, said bull rings abutting when assembled, and springs located in said pockets intermediate of said bull rings to press the latter outwardly against said snap rings, thereby providing a permanent adjustment so that said snap rings cannot become loose by wear.

MORTON C. HUTCHINSON.

Witnesses:
E. HAYWARD FAIRBANKS,
LEON G. BUCKWALTER,
RAYMOND H. MOYER.